United States Patent
Cheng

[19]

[11] Patent Number: 6,088,247

[45] Date of Patent: *Jul. 11, 2000

[54] VOLTAGE CLAMP

[75] Inventor: Kim Tung Cheng, Kwai Chung, The Hong Kong Special Administrative Region of the People's Republic of China

[73] Assignee: PI Electronics (H. K.) Limited, Kowloon, The Hong Kong Special Administrative Region of the People's Republic of China

[ * ] Notice: This patent is subject to a terminal disclaimer.

[21] Appl. No.: 09/318,612

[22] Filed: May 26, 1999

Related U.S. Application Data

[63] Continuation-in-part of application No. 08/960,359, Oct. 29, 1997, Pat. No. 5,986,905.

[51] Int. Cl.[7] .......................... H02H 7/122; H02M 3/335
[52] U.S. Cl. ................................. 363/56; 363/16; 363/20
[58] Field of Search .............................. 363/15, 16, 18, 363/19, 20, 21, 50, 55, 56, 97, 131

[56] References Cited

U.S. PATENT DOCUMENTS

| | | | |
|---|---|---|---|
| 4,016,482 | 4/1977 | Cielo et al. | 323/17 |
| 4,389,702 | 6/1983 | Clemente et al. | 363/21 |
| 4,688,157 | 8/1987 | Rischmueller | 363/20 |
| 4,754,385 | 6/1988 | McDade et al. | 363/16 |
| 5,621,623 | 4/1997 | Kuriyama et al. | 363/20 |
| 5,986,905 | 11/1999 | Cheng | 363/56 |

OTHER PUBLICATIONS

Tong et al., "Enternal –Sync Power Supply with Universal Input Voltage Range for Monitors", Motorola Semiconductor Application Note, 199, pp. 1–20.

Huber et al., "Optimizing Flyback Topologies for Portable AC/DC Adapter/Charger Applications –Part I: Adapter/Charger Requirements", POWER Aug. 1996, pp. 68 –75.

Huber et al., "Optimizing Flyback Topologies for Portable AC/DC Adapter/Charger Applications—Part II: DC/DC Converter Design", POWER, Sep. 1996, pp. 35–44.

*Primary Examiner*—Jessica Han
*Attorney, Agent, or Firm*—Leydig, Voit & Mayer

[57] ABSTRACT

A voltage clamp for a single-ended flyback converter provides partial leakage energy recovery and noise suppression. The voltage clamp is an improved version of a conventional RCD clamp. The voltage clamp includes two switches with different turn-off speeds. The voltage clamp includes a capacitor and two resistors. One resistor is connected in parallel with a capacitor and the other resistor is connected in parallel with the faster switch. The faster switch enables at least partial recovery of energy dissipated in a clamp resistor immediately after turn OFF of the slower switch. When the slower switch opens after the faster switch closes, noise in the circuit is suppressed by a damping resistor which remains effectively in a current path after the faster switch has re-opened.

13 Claims, 6 Drawing Sheets

VOLTAGE CLAMP

This disclosure is a continuation-in-part of U.S. patent application Ser. No. 08/960,359 filed Oct. 29, 1997, now U.S. Pat. No. 5,986,905.

BACKGROUND OF THE INVENTION

1. Field of the Invention

The invention relates to voltage clamps.

2. Description of Prior Art

The invention relates in particular to voltage clamps for single-ended flyback converters that limit the peak of switching voltages generated at turn-off of a switch connected to a normal primary winding of a flyback transformer. Conventionally a so-called "RCD clamp" is used. The RCD clamp includes a resistor, a capacitor and a diode where the automatic forward conduction of the diode, at a predetermined voltage differential, limits the voltage developed immediately after the switch (comprising a MOSFET or bipolar transistor, for example) is turned OFF. Significant power losses can occur, especially at more desirable and lower clamp voltages, when an RCD clamp is used.

So-called "active voltage clamps" are known and include a bidirectional switch and a relatively large capacitor which are arranged so as to allow energy stored in leakage inductance to be recycled. This reduces the power loss in the voltage clamp but the circuit complexity and cost make the active clamp unsuitable for low-cost power supplies.

SUMMARY OF THE INVENTION

It is an object of the invention to overcome or at least reduce these problems.

According to the invention there is provided a voltage clamp for a single-ended flyback converter comprising two switches with different turn-off speeds, the clamp having one resistor in parallel with the faster switch, and a resistor/capacitor parallel circuit in series with the resistor/faster switch parallel circuit and with the slower switch.

Preferably, each of the switches comprises a diode, the diodes having respective different reverse recovery speeds.

BRIEF DESCRIPTION OF THE DRAWINGS

A voltage clamp according to the invention will now be described by way of example with reference to the accompanying drawings in which.

DESCRIPTION OF THE PREFERRED EMBODIMENT

Figure 1:
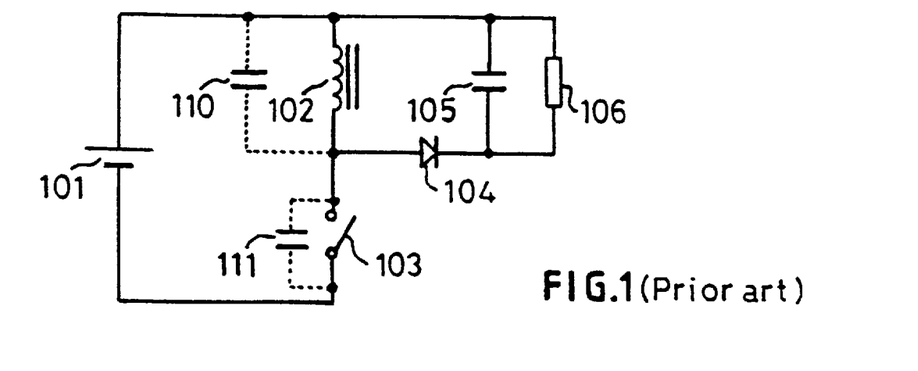
FIG. 1 is a circuit diagram of a conventional RCD clamp.

Referring to the drawings, in FIG. 1 a conventional RCD clamp is shown. The circuit comprises a battery 101 which is connected to supply a primary winding 102 of a flyback transformer via a switch 103 (the secondary winding and components are now shown as they are well understood in the art of flyback converters). The RCD clamp comprises a diode 104, a capacitor 105 and a resistor 106. Inherent parasitic capacitors 110 and 111 are shown with dotted connections. The RCD clamp is required to limit the peak of the switching voltage, which occurs when the switch 103 is opened, due to the existence of leakage inductance in the flyback transformer.

When the switch 102 is opened, magnetic energy stored in the leakage inductance cannot release to the secondary side of the flyback transformer and causes resonant oscillation with the parasitic capacitances 110 and 111. Under normal circumstances, the parasitic capacitances are kept minimum to avoid excessive $CV^2$ energy loss at turn-on and hence they are usually small (in the range of several hundred pF). As the characteristic impedance of the resonant tank and hence the oscillation amplitude of the LC circuit are large, the peak switch voltage is very high. This, for example, would be more than twice the input voltage without a voltage clamp across the primary winding of the flyback transformer or the main switch. Thus, an RCD clamp (106, 105, 104) is used in common practice to clip the large-amplitude parasitic oscillation so that a lower voltage rating device can be used as the switch 103.

Figure 2:
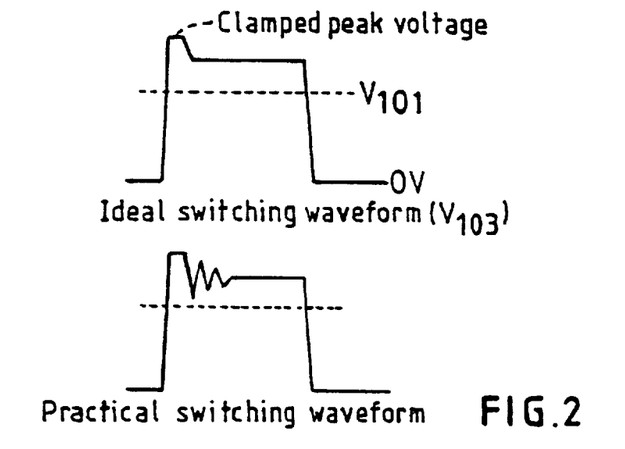
FIG. 2 shows waveforms of an ideal clamped voltage and a practical clamped voltage.

The ideal switch voltage waveform is shown in the upper part of FIG. 2. Immediately after turn-off, the switch voltage rises rapidly. When the voltage reaches the voltage of the capacitor 105 plus the input voltage, the diode 104 conducts and the switch voltage is clamped at that level until all energy stored in the leakage inductance vanishes. The clamped peak voltage is controlled by the resistance of a resistor 106. The switch voltage then stays at the level of the reflected secondary voltage plus the input voltage until the end of the off period. Here, continuous conduction mode is assumed and it can be shown that the power loss of an ideal RCD clamp is, $$P_{clamp} = \frac{1}{2} L_1 I_{pk}^2 f_s \left(1 + \frac{nV_o}{V_{pk} - V_{cc} - nV_o}\right) = \frac{(V_{pk} - V_{cc})^2}{R_{clamp}}$$

where
$L_1$=leakage inductance reflected to the primary side
$I_{pk}$=primary peak current
$f_s$=switching frequency
n=turn ratio between primary and secondary windings
$V_o$=output voltage
$V_{pk}$=peak main switch voltage
$V_{cc}$=DC input voltage
$R_{clamp}$=resistance of the clamp resistor.

From the above formula, the minimum power loss in the RCD clamp is the power stored in the leakage inductance. But this occurs when the clamp voltage is infinite. In general, a lower clamp voltage (and hence a lower peak main switch voltage) leads to a higher power loss in the RCD clamp. In actual cases, some troublesome high-frequency parasitic oscillations (as shown in the lower part of FIG. 2) usually occur after the diode 104 is turned off. Again, this is due to the resonant oscillation of the leakage inductance and the parasitic capacitances. In such a case, an RC snubber may be added across the switch 103, or the primary winding 102 of the flyback transformer, to suppress this stray oscillation which may be harmful to electromagnetic compatibility. However, the RC snubber causes additional power loss. Also, it will be noted that the amplitude of the stray oscillation directly relates to the reverse recovery time of the diode 104. In order to minimize the stray oscillation amplitude, an ultra-fast diode (e.g. BYV26C from Philips) may be used in the place of 104.

However, the preferred embodiments of the present invention provide an improved RCD clamp comprising two switches which have different turn-off speeds. They are essentially connected in series. The faster switch is responsible to recycle part of the leakage energy to the output circuit while the slower switch, together with a damping resistor connected in parallel with the faster switch, provide noise suppression after the faster switch is turned off, as described with reference to FIG. 3.

In this improved RCD clamp, part of the leakage energy is recycled without any additional noise generation. The switching voltage waveform (see FIG. 4) resembles the ideal one and the switches in the clamp only need to handle peak currents over a relatively short duration after each turn-off. Moreover, the switches in the improved clamp do not require accurate control timings for their operation; this reduces the circuit complexity and hence the cost.

Figure 3:
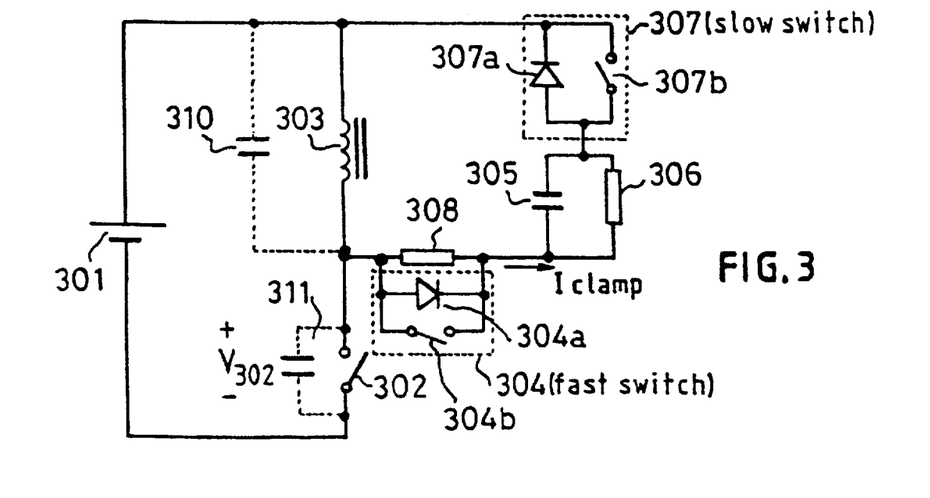
FIG. 3 shows a circuit diagram of a clamp according to the invention.

In FIG. 3, the numbers correspond to respective components in FIG. 1 and it will be seen that the diode 104 has been replaced by a fast switch 304 comprising a diode 304a and a switch 304b connected in parallel. The fast switch 304 is in turn connected in parallel with a damping resistor 308. The circuit also includes a (relatively) slow switch 307 comprising a diode 307a and a switch 307b. The slow switch is connected in series with a parallel connection of a diode 305 and a resistor 306 (equivalent to diode 105 and resistor 106 of FIG. 1).

The main idea of embodiments of the present invention is to improve the conventional RCD clamp in two aspects—to recover part of the power loss in the clamp and to minimize the stray oscillation after the clamp diode is turned off. The manifestation of the improvement takes place, in affect, in two phases.

In order to recover part of the energy dissipated in the clamp resistor, reverse current conduction is necessary in the clamp diode. Hence a bidirectional switch 304 replaces the clamp diode 104 in FIG. 1. It is assumed that in the first phase the other bidirectional switch 307 is shorted for this discussion. The corresponding clamp current during the forward and reverse conduction periods of the bidirectional switch is shown in period 2 and 3 of FIG. 4. Theoretically, if the reverse conduction time is as long as the forward conduction time and the clamp voltage remains constant during these two conduction periods, then all energy losses stated by the formula of the conventional RCD clamp can be completely recovered. This is similar to an active clamp, but the whole clamp action is completed over a much shorter period than the whole turn-off period as in the case of an active clamp. As a result, the peak clamp voltage of the improved RCD clamp is higher than of an active clamp. This should not be viewed as a shortcoming because as far as the improved RCD clamp circuit is concerned using a "self-controlled" bidirectional switch is much simpler than using an active clamp. In general or in practice, the reverse conduction time is less than the forward conduction time and the energy losses in the clamp resistor can only be partially recovered. The reverse conduction time can be freely controlled by the switch 304b.

Most of the fast-recovery and ultra fast-recovery diodes available are snap recovery. Therefore, when the clamp diode (104 in FIG. 1) of the conventional RCD clamp turns off, the leakage inductance of the flyback transformer and the parasitic capacitances across the primary winding (110 and 111 in FIG. 1) will cause stray oscillation. The oscillation amplitude increases with the magnitude of the reverse current when the clamp diode turns off. Thus, although longer reverse conduction time saves more energy from being dissipated in the clamp resistor, this is penalized by more severe parasitic oscillation after the turn-off of the bidirectional switch 304.

The damping circuit formed by the bidirectional switch 307 and the resistor 308 is introduced as the second phase. The damping action occurs in the period 3 of the switching waveform shown in FIG. 4. At the end of period 2, the switch 304b is turned off and the reverse current is forced to flow through the resistor 308. The bidirectional switch 307 remains on at least from period 0 to period 3; it is a slower switch than the faster switch 304. As the switch 304 is replaced by the damping resistor 308 in period 3, the parallel resonant circuit formed by the leakage inductance of the flyback transformer, the primary parasitic capacitance and the damping resistor is damped, and the stray oscillation is thus suppressed. For proper circuit operation, the capacitance of 306 should be much larger than the primary parasitic capacitance. The slower switch may be turned off any time after the reverse current decreases close to zero, but before the switch 302 is switched on again.

Figure 4:
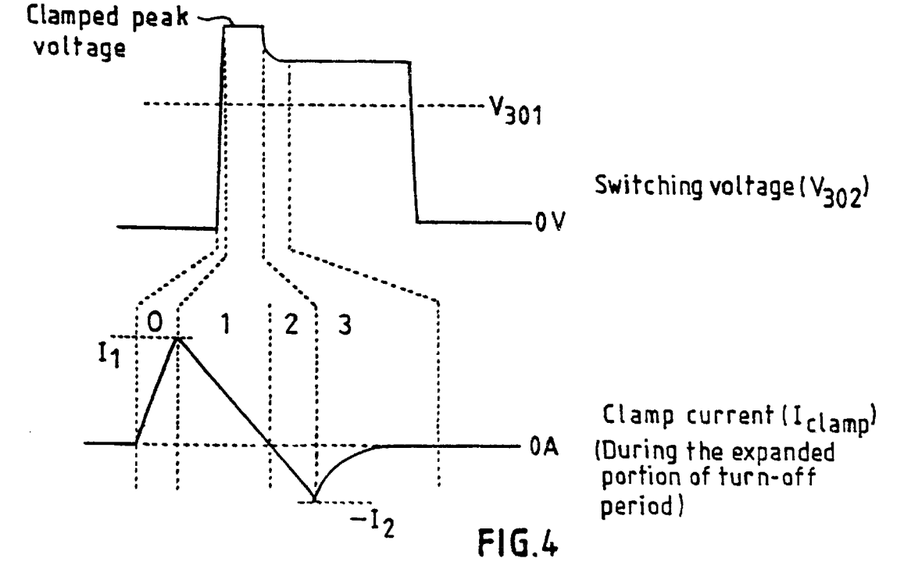
FIG. 4 shows waveforms of the clamp of FIG. 3.

The following summarizes the circuit operation of all characteristic periods shown in FIG. 4:

Period 0—The main switch 302 is turned off. The switch voltage rises to the clamped peak voltage and the clamp current ($I_{clamp}$) rises from 0 to $I_1$ (the primary peak current). Then the diode 304a of the bidirectional switch 304 and the diode 305a of the bidirectional switch 305 conduct.

Period 1—The clamp current (also the primary current) decreases from the positive peak current $I_1$ to zero with a discharging slope of (Clamped peak voltage—input voltage—reflected secondary output voltage)/Leakage inductance. The resonant frequency of the leakage inductance and the primary parasitic capacitance is assumed to be much smaller than the total time duration of periods 0, 1, 2, and 3.

Period 2—Before the clamp current crosses zero, the switch 304b of the bidirectional switch 304 and the switch 305b of the bidirectional switch 305 are turned on. The clamp current reverses its direction and becomes negative. But the dI/dt slope is the same as in period 1. This period ends when the switch 302b of the fast switch 302 is turned off at the clamp current $-I_2$.

Period 3—The slow switch 305 remains on. The clamp current is damped from $-I_2$ to zero by the damping resistor 308.

Figure 5:
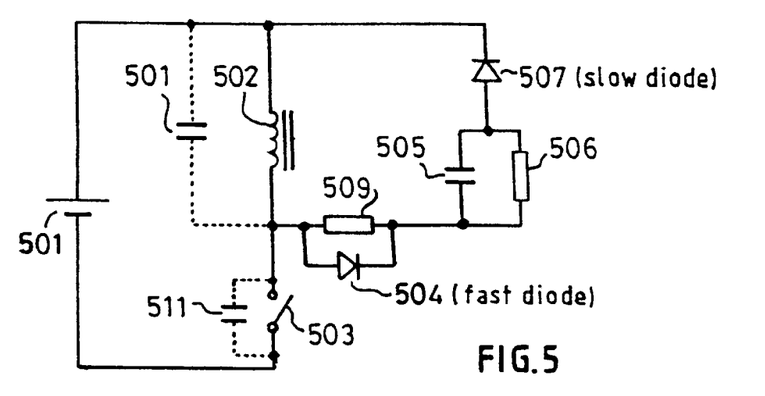
FIG. 5 shows a circuit diagram of another clamp according to the invention.

The simplest practical implementation of the improved RCD clamp is shown in FIG. 5. Each bidirectional switch (304 and 307 in FIG. 3) is implemented by a rectifier with finite reverse recovery time. Hence, the two bidirectional switches 504 and 507 are single rectifiers without any external control circuit. Two example rectifier pairs are:

| Fast SW | Slow SW | Switching frequency range |
|---|---|---|
| MUR140 Motorola ($t_{rr}$= 75 ns) | ERB43-08 Fuji ($t_{rr}$= 0.4 μs) | 100K–1 MHz |
| 1N4935 GI ($t_{rr}$= 200 ns) | GP08J GI ($t_{rr}$= 2 μs) | 20–250 KHz |

Alternatively, in order to implement the improved RCD clamp, the clamping resistor 308 and fast switch 304 in FIG. 3 may be replaced by a single rectifier with reverse leakage characteristics. In such circumstances, the function of the clamping resistor 308 during the period when the fast switch 304 is turned off is carried out by the single rectifier by means of its reverse leakage characteristics.

Note that the reverse recovery time $t_{rr}$ is different from the time duration of period 2 in FIG. 4. In general, the actual reverse recovery time depends on the circuit parameters, and the reverse recovery time of the slower rectifier is approximately five to ten times longer than the faster rectifier in each pair.

Figure 6:
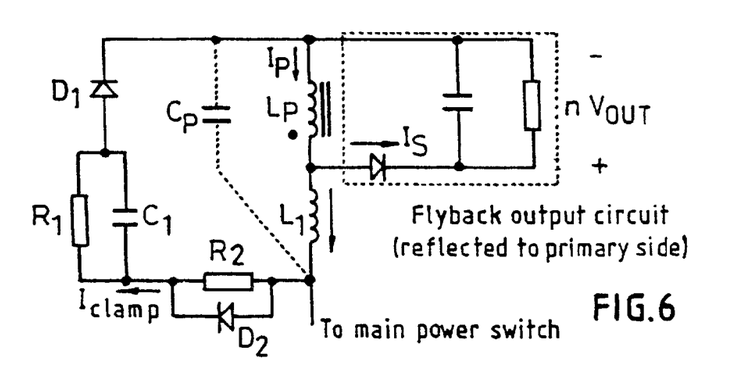
FIG. 6 is an equivalent circuit of part of the circuit of FIG. 5.

The improved RCD clamp is theoretically analyzed with reference to FIG. 6 and the power saving of the improved clamp circuit over the conventional RCD clamp will become apparent. FIG. 6 shows the equivalent circuit of a single-ended flyback converter operating with the improved RCD clamp during the turn-off period of the main switch. The output circuit is reflected to the primary side (encircled by dotted rectangle). The leakage inductance of the flyback transformer is modelled as a lumped inductance of the flyback transformer is modelled as a lumped inductance $L_1$ in series with the magnetizing inductance $L_p$. For simplicity, the two bidirectional switches are represented by two rectifiers with finite reverse recovery time (as in FIG. 5). $D_1$ is the slower diode and $D_2$ is the faster diode. The capacitance $C_p$ is the lumped parasitic capacitance seen by the primary winding. Other components ($R_1$, $R_2$, and $C_1$) in the clamp have one-to-one correspondence with FIG. 5.

Two more assumptions are made. Firstly, the damping resistor $R_2$ is adjusted so that the parallel resonant circuit formed by $L_1$ and $C_p$ is critically damped. The corresponding condition is, $$\xi = \frac{1}{2R_2}\sqrt{\frac{L_1}{C_P}} = 1 \quad \text{(damping ratio)}$$

and both the clamp current and the primary voltage are exponential with a decay time constant of the recipical of the angular resonant frequency $\omega_n$.

The second assumption is that the capacitance $C_1$ is large enough to hold the capacitor voltage of $C_1$ ($V_c$) fairly constant over switching cycles.

The power loss in the clamp can then be calculated as follows:

$$P_C = \left[V_C \int^{t_{off}} I_{clamp}\,dt + \int^{t_3} I^2_{clamp} R_2\,dt\right] f_s$$

The time duration shown on the top of the integral sign means that the integration is carried out over the time period. The total turn-off time of the main switch is denoted as $t_{off}$ and the time duration of period 3 is $t_3$.

The first part of the power loss is dissipated in the clamp resistor $R_1$ and the second part is dissipated in the damping resistor $R_2$. Both are greater or equal to zero.

The effect of the time duration ($t_2$) of period 2 is discussed as follows. The negative peak current $I_2$ is linearly dependent on the time duration $t_2$ because the clamped peak voltage is essentially constant and hence the $dI/dt$ slope of the clamp current is also constant. The slope can be shown to be $(V_c - nV_o)L_1$. As the time interval $t_2$ increases, the average clamp current (the first integral) decreases because the negative part of the clamp current offsets the positive part more. This results in less power dissipation in the clamp resistor $R_1$. However, as the negative peak current $I_2$ increases, the power dissipation in the damping resistor $R_2$ also increases. Therefore, the dependence of the two integrals on the time interval $t_2$ have opposite effects on the total power dissipation of the clamp.

The total power loss $P_c$ of the high-efficiency RCD clamp can be shown to be, $$P_C = \frac{1}{2}\frac{V_C}{V_C - nV_O}L_1 I_1^2 f_s - \left(\frac{V_C^2 - (nV_O)^2}{4L_1}t_2^2 + \frac{V_C(V_C - nV_O)}{\omega_n L_1}t_2\right)f_s$$

where $$\omega_n = \frac{1}{\sqrt{L_1 C_P}}$$

(resonant frequency). The first term is equal to the power loss of the conventional RCD clamp. The power saving of the high-efficiency RCD clamp relative to the conventional RCD clamp is the whole second term which is a function of the time interval $t_2$. From this equation, the power loss may be reduced to zero by increasing the time interval $t_2$ to a certain value. But, as stated before, the minimum power loss in the high-efficiency RCD clamp is the power loss in the damping resistor which is, in practice, not totally recovered.

Figure 7:
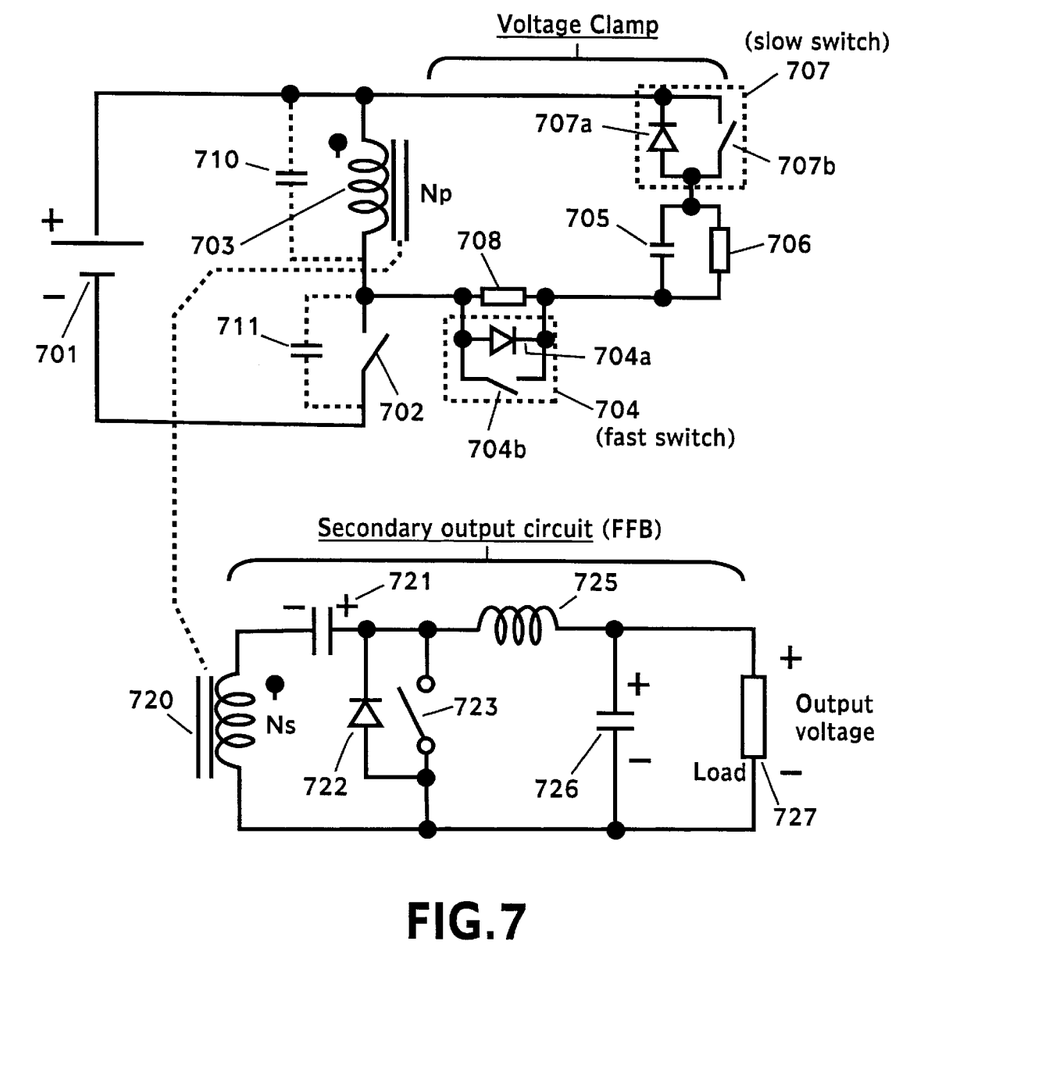
FIG. 7 shows a circuit diagram of a flyback converter having a voltage clamp according to the invention.

The high efficiency RCD clamp is also applicable to the Forward-Flyback-Buck (FFB) converter shown in FIG. 7. The circuit arrangement of the primary side is same as the flyback converter shown in FIG. 3. The major difference between FIGS. 3 and 7 is in the secondary output circuit arrangement.

A coupling capacitor 721 is connected between a transformer secondary winding Ns and a free-wheeling rectifier 722. A buck-type LC output circuit 725 and 726 is cascaded to the free-wheeling rectifier and produces an output voltage across an output capacitor 726. An active switch 723 may be used to reduce the forward voltage and hence the power loss of the rectifier 722. The combination of a switch 723 and the rectifier 722 is generally known as a synchronous rectifier. Various control methods of this active switch 723 may be used to achieve resonant-transition switching, which is disclosed in U.S. patent application Ser. No. 09/018,935.

The circuit operation of the converter circuit shown in FIG. 7 is as follows. When a primary switch 702 is turned on, both the magnetizing current of the transformer and the current in an output inductor 725 increase linearly. The converter operates in a forward mode. At a certain level of primary current, the control circuit turns off the primary switch 702. The voltage across the switch 702 then rises rapidly until it reaches a voltage level set by the voltage clamp. At this moment, both rectifiers 704a and 707a conduct. The energy stored in leakage inductances of a power transformer 703 is released to a clamp capacitor 705. In the secondary output circuit, a free-wheeling rectifier 722 is turned on after the primary switch 702 turns off. The synchronous rectifier may also be operated at the same time. The converter now operates in flyback mode. The energy stored in the power transformer is released to the coupling capacitor 721 and the energy stored in the output inductor is released to the output capacitor 726.

During the flyback period, both switches 704b and 707b in the voltage clamp are required to switch on before the current flowing through their anti-parallel diodes 704a and 707a, respectively, decreases to zero. This allows the recovery of some leakage energy previously stored in the clamp capacitor 705, as in the case described in the flyback converter. A slow switch 707 together with a damping resistor 708 removes the undesired oscillation following the turn-off of a fast switch 704.

All operational details of the clamp circuit shown in FIG. 7 are the same as for the circuit shown in FIG. 3.

Consequently, the simple implementation of this improved RCD clamp using a fast-recovery and a slow-recovery rectifier shown in FIG. 5 is also applicable to the converter circuit shown in FIG. 7.

Figure 8:
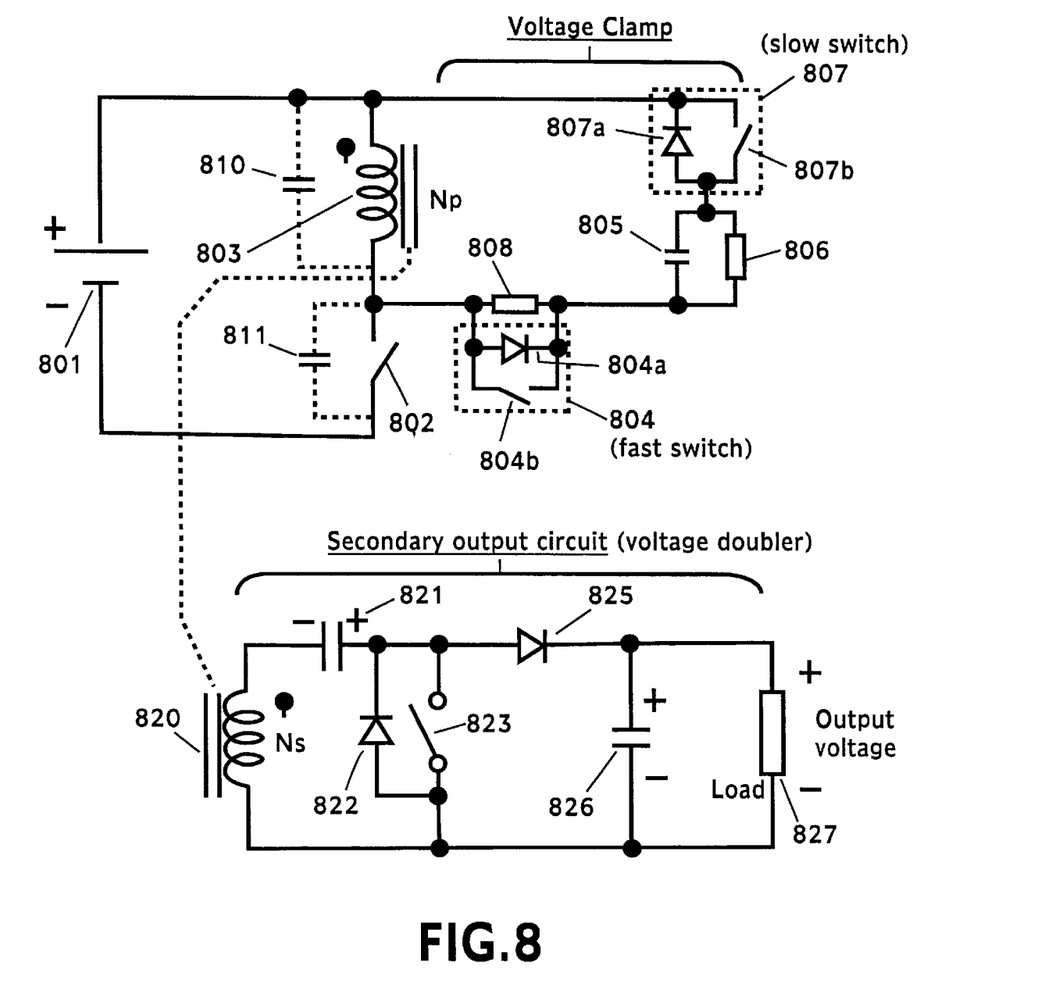
FIG. 8 shows a circuit diagram of another flyback converter having a voltage clamp according to the invention.

The high efficiency RCD clamp is applicable to the DC-to-DC converter shown in FIG. 8. The circuit arrangement of the primary side is the same as the flyback converter depicted in FIG. 3. The secondary output circuit however consists of a voltage doubler configuration. The output circuit arrangement of the converter in FIG. 8 provides an output voltage equal to the peak-to-peak voltage across the secondary transformer winding Ns. An active switch 823 may be used as a synchronous rectifier to reduce forward voltage of a rectifier 822. When a main switch 802 is turned off, the energy stored in a transformer 820 is released to a coupling capacitor 821 through the conduction of a rectifier 822 or a synchronous rectifier pair 822 and 823. The converter now operates in flyback mode.

During the flyback period, both switches 804b and 807b in the voltage clamp are required to switch on before current flowing through their anti-parallel diodes 804a and 807a, respectively, decrease to zero. This allows the recovery of some leakage energy previously stored in a clamp capacitor 805, as in the case described in for the flyback converter. A slow switch 807 together with damping resistor 808 removes undesirable oscillation following the turn-off of a fast switch 804.

All operational details of the clamp circuit shown in FIG. 8 are the same as for the circuit shown in FIG. 3. Furthermore, the simple implementation of this improved RCD clamp using a fast-recovery and a slow-recovery rectifiers shown in FIG. 5 is also applicable to the converter circuit shown in FIG. 8.

Figure 9:
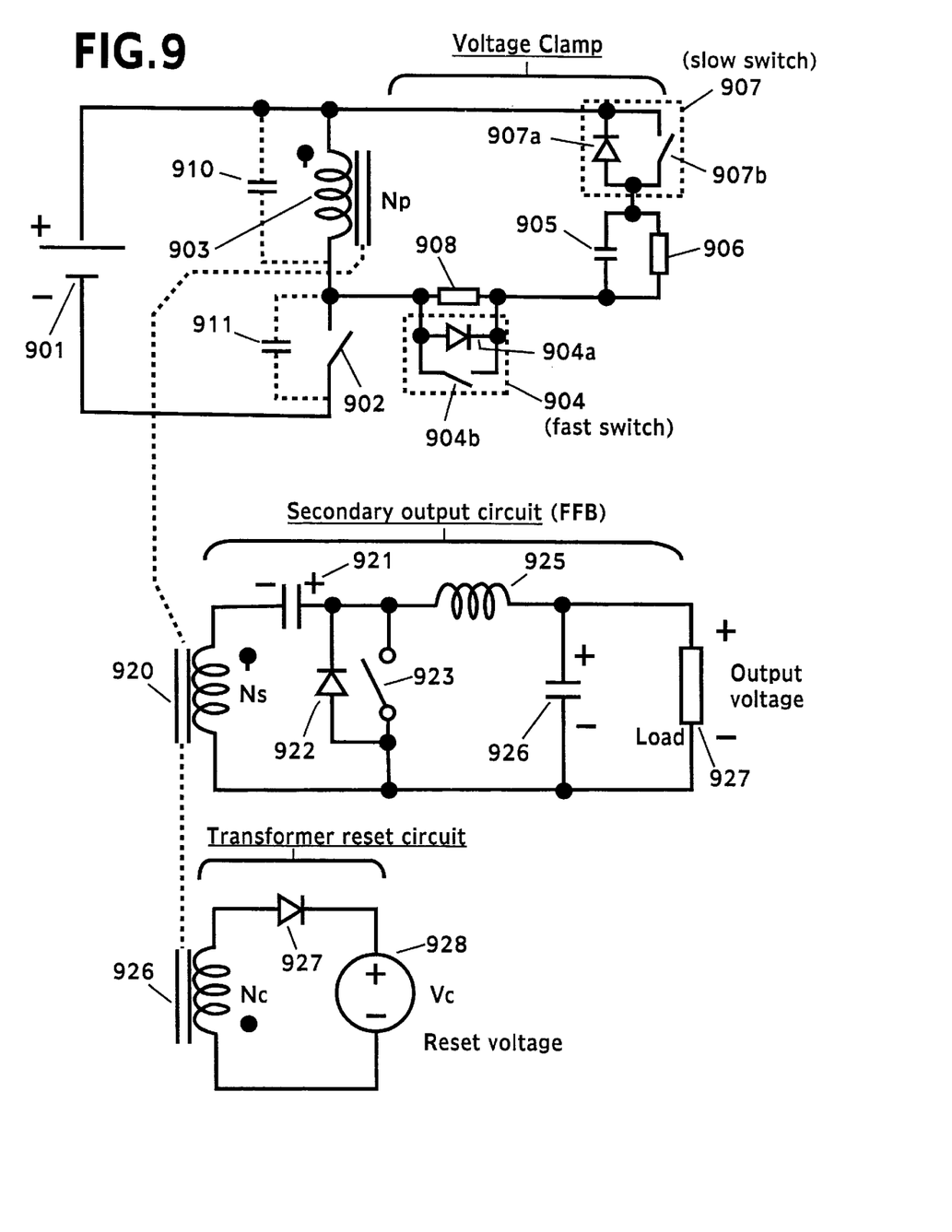
FIG. 9 shows a circuit diagram of a further flyback converter having a voltage clamp according to the invention.

FIG. 9 shows another application of the voltage clamp to a conventional forward converter with a reset winding. The circuit arrangement of the primary side is same as the flyback converter depicted in FIG. 3. The secondary output circuit is simply a forward (buck) converter.

A single-ended forward converter requires some means to reset the transformer during an off period. A reset or clamp winding $N_c$ and its associated circuit arrangement shown in FIG. 9 is already known. All three windings $N_p$, $N_s$ and $N_c$ in FIG. 9 are closely coupled. The energy stored in a transformer 926 is released to a reset voltage $V_c$ when a main switch is turned off (off period).

The converter now operates in flyback mode. A forward output circuit is disconnected from the secondary winding $N_s$ during flyback period because a rectifier 921 is reverse-biased. The reset voltage may be an input voltage 901 or an output voltage or any other convenient voltage source. Turns ratio $N_p/N_c$ and a reverse-voltage rating of a rectifier 927 are required for adjustment according to the choice of reset voltage.

During a flyback or reset period, both switches 904b and 907b in the voltage clamp are required to switch on before the current flowing through their anti-parallel diodes 904a and 907a, respectively, decreases to zero. This allows the recovery of some leakage energy previously stored in a clamp capacitor 905, as in the case described for the flyback converter. A slow switch 907 together with a damping resistor 908 removes the undesirable oscillation following the turn-off of the fast switch 904.

All operational details of the clamp circuit shown in FIG. 9 are the same as for the circuit shown in FIG. 3. Moreover, the simple implementation of this improved RCD clamp using a fast-recovery and a slow-recovery rectifier shown in FIG. 5 is also applicable to the converter circuit shown in FIG. 9.

Figure 10:
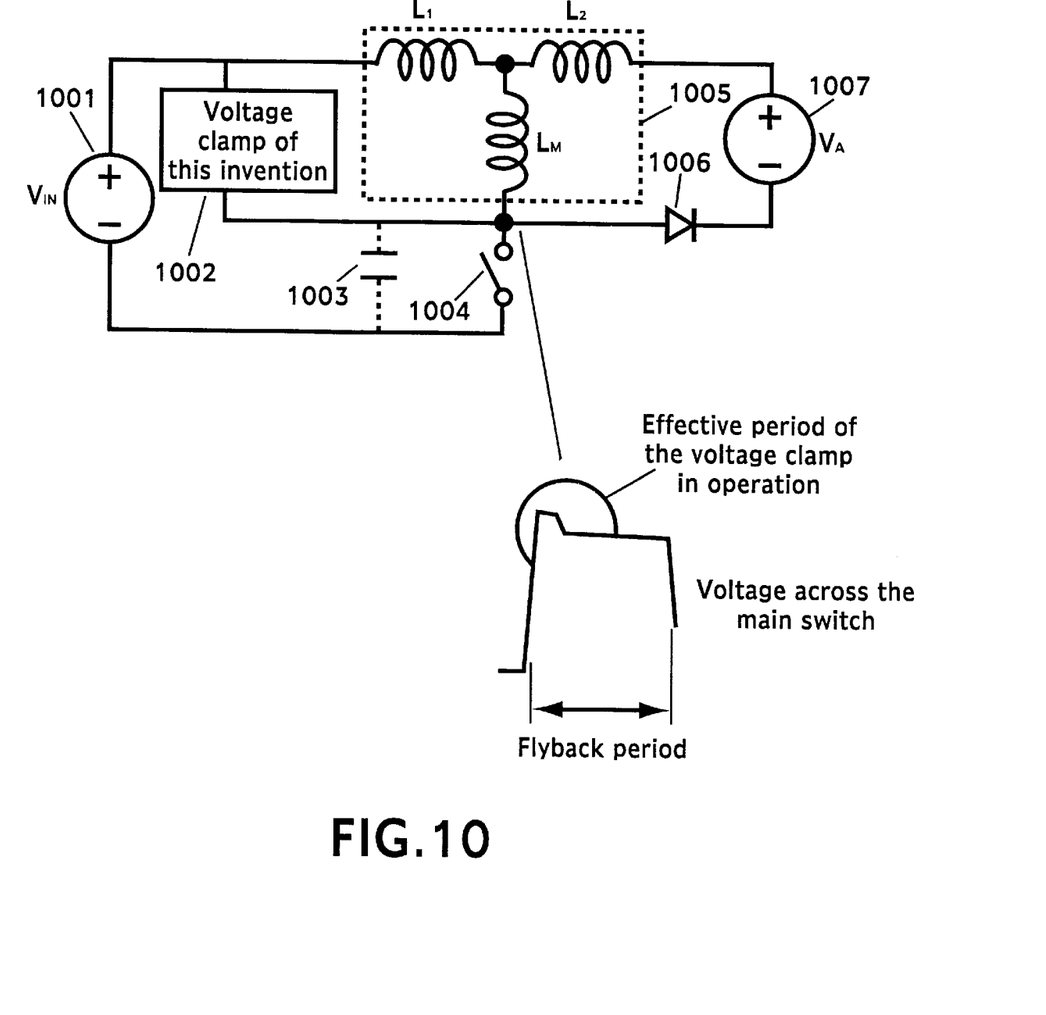
FIG. 10 is an equivalent circuit of a flyback converter and a voltage clamp.

In general, the voltage clamp of embodiments of the present invention are applicable to any flyback-embedded single-ended converter circuit. The three converters described above are specific examples. In a flyback-embedded converter circuit, the operation consists of at least one flyback period in a switching cycle. During the flyback period, the converter circuit can be reduced to an equivalent flyback circuit as shown in FIG. 10, with the connection of a voltage clamp 1002. A transformer is represented in a T-form 1005, in which $L_M$ is the magnetizing inductance and $L_1$ and $L_2$ are leakage inductances of the windings. A voltage $V_A$ 1007 and a rectifier 1006 are equivalent to the output voltage and the output rectifier of the flyback converter shown in FIG. 6. The voltage clamp comes into operation during a first part of a flyback period (circled portion in FIG. 10). Two main features are partial recovery of the energy stored in the leakage inductances of the transformer and damping of parasitic oscillation caused by leakage inductances and a parasitic capacitance 1003 of a main switch 1004 and the transformer 1005. All operational details of the voltage clamp have been described above in respect of the flyback converter shown in FIGS. 3 and 4.

What is claimed is:

1. A voltage clamp for a voltage converter having:
   a primary input stage comprising a primary switch connected in series with a primary winding,
   a secondary output stage, said voltage clamp limiting a peak of a switching voltage when said primary switch is opened and being connected in parallel with and across said primary winding,
   first and second switches having respective first and second turn-off speeds, the first turn-off speed being faster than the second turn-off speed, said first switch being electrically connected to said primary input stage between said primary switch and a first side of said primary winding,
   a first resistor connected in parallel with said first switch, forming a first parallel circuit, and
   a second resistor and a capacitor connected in a second parallel circuit, said second parallel circuit being connected in series with and between said first parallel circuit and said second switch.

2. The voltage clamp as claimed in claim 1 wherein said secondary output stage of said converter comprises:
   a secondary winding,
   a coupling capacitor,
   a rectifier connected in parallel across said secondary winding and said coupling capacitor, and
   an output LC circuit connected in parallel across said rectifier.

3. The voltage clamp as claimed in claim 2 including an active switch connected across said rectifier.

4. The voltage clamp as claimed in claim 1 wherein secondary output stage of said converter comprises:
   a secondary winding,
   a coupling capacitor,
   a rectifier connected in parallel across said secondary winding and said coupling capacitor, and
   an output circuit comprising a diode and a capacitor connected in parallel across said rectifier.

5. The voltage clamp as claimed in claim 4 including active switch connected across said rectifier.

6. The voltage clamp as claimed in claim 1 wherein said secondary output stage of said converter comprises:
   a secondary winding, a first rectifier connected to said secondary winding, a second rectifier connected in parallel across said secondary winding and said first rectifier, an output LC circuit connected in parallel across said second rectifier, and a transformer reset circuit.

7. The voltage as claimed in claim 6 wherein said transformer reset circuit comprises a tertiary winding coupled to said primary winding and said secondary winding and means for applying a reset voltage.

8. The voltage clamp as claimed in claim 1 wherein each of said first and second switches comprises a diode, said diodes having respective different reverse recovery speeds.

9. The voltage clamp as claimed in claim 1 wherein said first parallel circuit comprises a first diode and said second switch comprises a second diode with relatively slower reverse recovery speed that said first diode.

10. The voltage clamp as claimed in claim 1 wherein said first parallel circuit includes an equivalent rectifier with reverse leakage characteristics.

11. A voltage clamp for a voltage converter having:

a primary input stage comprising a primary switch connected in series with a primary winding, a secondary output stage comprising:
   a secondary winding,
   a coupling capacitor connected to said secondary winding,
   a rectifier connected in parallel with and across said secondary winding and said coupling capacitor, and
   an output LC circuit connected tin parallel with and across said rectifier, said voltage clamp limiting a peak of a switching voltage when said primary switch is opened and being connected in parallel with and across said primary winding, first and second switches having respective first and second turn-off speeds, the first turn-off speed being faster than the second turn-off speed, said first switch being electrically connected to said primary input stage between said primary switch and a first side of said primary winding, a first resistor connected in parallel with said first switch, forming a first parallel circuit, and a second resistor and a capacitor connected in a second parallel circuit, said second parallel circuit being connected in series with and between said first parallel circuit and said second switch.

12. A voltage clamp for a voltage converter having:

a primary input stage comprising a primary switch connected in series with a primary winding, a secondary output stage comprising:
   a secondary winding,
   a coupling capacitor connected to said secondary winding,
   a rectifier connected in parallel with and across said secondary winding and said coupling capacitor, and
   an output circuit comprising a diode and a capacitor connected in parallel with and across said rectifier, said voltage clamp limiting a peak of a switching voltage when said primary switch is opened and being connected in parallel with and across said primary winding, first and second switches having respective first and second turn-off speeds, the first turn-off speed being faster then the second turn-off speed, said first switch being electrically connected to said primary input stage between said primary switch and a first side of said primary winding, a first resistor connected in parallel with said first switch, forming a first parallel circuit, and a second resistor and a capacitor connected in a second parallel circuit, said second parallel circuit being connected in series with and between said first parallel circuit and said second switch.

13. A voltage clamp for a voltage converter having:

a primary input stage comprising a primary switch connected in series with a primary winding, a secondary output stage comprising:
   a secondary winding,
   a first reverse-biased rectifier connected to said secondary winding,
   a second rectifier connected in parallel with and across said secondary winding and said first reverse-biased rectifier,
   an output LC circuit connected in parallel with and across said second rectifier, and
   a transformer reset circuit including a tertiary winding coupled to said primary and secondary windings, said voltage clamp limiting a peak of a switching voltage when said primary switch is opened and being connected in parallel with and across said primary winding, first and second switches having respective first and second turn-off speeds, the first turn-off speed being faster than the second turn-off speed, said first switch being electrically connected to said primary input stage between said primary switch and a first side of said primary winding, a first resistor connected in parallel with said first switch, forming a first parallel circuit, and a second resistor and a capacitor connected in a second parallel circuit, said second parallel circuit being connected in series with and between said first parallel circuit and said second switch.

* * * * *